US012322536B2

(12) United States Patent
Park et al.

(10) Patent No.: US 12,322,536 B2
(45) Date of Patent: Jun. 3, 2025

(54) COIL COMPONENT

(71) Applicant: SAMSUNG ELECTRO-MECHANICS CO., LTD., Suwon-si (KR)

(72) Inventors: Ji Young Park, Suwon-si (KR); Myoung Soon Park, Suwon-si (KR); Sung Hee Kim, Suwon-si (KR); Han Kyeol Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 939 days.

(21) Appl. No.: 17/191,971

(22) Filed: Mar. 4, 2021

(65) Prior Publication Data

US 2022/0165479 A1 May 26, 2022

(30) Foreign Application Priority Data

Nov. 25, 2020 (KR) ........................ 10-2020-0160117

(51) Int. Cl.
*H01F 27/28* (2006.01)
*H01F 27/29* (2006.01)
(Continued)

(52) U.S. Cl.
CPC ......... *H01F 27/2804* (2013.01); *H01F 27/29* (2013.01); *H01F 27/324* (2013.01);
(Continued)

(58) Field of Classification Search
CPC ............. H01F 17/0013; H01F 17/0006; H01F 27/2804; H01F 2027/2809; H01F 5/003; H01F 27/29; H01F 27/324
(Continued)

(56) References Cited

U.S. PATENT DOCUMENTS 10,847,308 B2 11/2020 Jung et al.
2013/0093556 A1* 4/2013 Lim .................... H01F 17/0013 336/200

(Continued)

FOREIGN PATENT DOCUMENTS

KR 10-2013-0039400 A 4/2013
KR 10-2015-0033343 A 4/2015

(Continued)

OTHER PUBLICATIONS

Korean Office Action dated Mar. 20, 2025 issued in Korean Paten Application No. 10-2020-0160117 (with English translation).

*Primary Examiner* — Tszfung J Chan
(74) *Attorney, Agent, or Firm* — MORGAN, LEWIS & BOCKIUS LLP

(57) ABSTRACT

A coil component includes a body, a support substrate disposed in the body, a coil portion including a first lead-out pattern disposed on a first surface of the support substrate, a first dummy pattern portion disposed to be spaced apart from the first lead-out pattern on the first surface of the support substrate, and a first external electrode disposed on the body to be connected to the first lead-out pattern, wherein the first lead-out pattern and the first dummy pattern portion are exposed to a first surface of the body to be spaced apart from each other, and the first surface of the support substrate, supporting the first lead-out pattern and the first dummy pattern portion, is continuously exposed to the first surface of the body.

17 Claims, 5 Drawing Sheets

(51) Int. Cl.
*H01F 27/32* (2006.01)
*H01F 41/04* (2006.01)
*H01F 41/12* (2006.01)

(52) U.S. Cl.
CPC ......... *H01F 41/041* (2013.01); *H01F 41/122* (2013.01); *H01F 2027/2809* (2013.01)

(58) Field of Classification Search
USPC .................................................. 336/200, 232
See application file for complete search history.

(56) References Cited

U.S. PATENT DOCUMENTS

| | | | | |
|---|---|---|---|---|
| 2018/0268990 | A1* | 9/2018 | Lee | H01F 27/29 |
| 2018/0350509 | A1* | 12/2018 | Jung | H01F 27/292 |
| 2019/0013143 | A1 | 1/2019 | Kim et al. | |

FOREIGN PATENT DOCUMENTS

| | | | | | |
|---|---|---|---|---|---|
| KR | 2015068940 | A | * | 6/2015 | H01F 17/0006 |
| KR | 10-2018-0131940 | A | | 12/2018 | |
| KR | 10-2019-0004915 | A | | 1/2019 | |
| KR | 10-2020-0105778 | A | | 9/2020 | |

* cited by examiner

COIL COMPONENT

CROSS-REFERENCE TO RELATED APPLICATION(S)

The present application claims the benefit of priority to Korean Patent Application No. 10-2020-0160117, filed on Nov. 25, 2020 in the Korean Intellectual Property Office, the entire disclosure of which is incorporated herein by reference.

TECHNICAL FIELD

The present disclosure relates to a coil component.

BACKGROUND

An inductor, a coil component, is a typical passive electronic component used in electronic devices, along with a resistor and a capacitor.

In the case of a thin film type coil component, among coil components, a process is performed in units of large areas, in which a plurality of coils (or bodies) constitute rows and columns, and a dicing process is then performed to separate the plurality of coils (or bodies) from each other. In the dicing process, cracking may occur in the body because materials of the body and the coil are different from each other.

SUMMARY

An aspect of the present disclosure is to provide a coil component for preventing deformation of a support substrate on which a coil portion is formed.

According to an aspect of the present disclosure, a coil component includes a body, a support substrate disposed in the body, a coil portion including a first lead-out pattern disposed on a first surface of the support substrate, a first dummy pattern portion disposed to be spaced apart from the first lead-out pattern on the first surface of the support substrate, and a first external electrode disposed on the body to be connected to the first lead-out pattern. The first lead-out pattern and the first dummy pattern portion are exposed to a first surface of the body. The first surface of the support substrate, supporting the first lead-out pattern and the first dummy pattern portion, is continuously exposed to the first surface of the body.

According to another aspect of the present disclosure, a coil component includes a body; a support substrate disposed in the body; a coil portion comprising a first coil pattern and a first lead-out pattern disposed on a first surface of the support substrate, the first lead-out pattern extending from the first coil pattern; a first dummy pattern portion disposed directly on the first surface of the support substrate; and a first external electrode disposed on the body to be connected to the first lead-out pattern. The first dummy pattern portion is spaced apart from the first coil pattern and the first lead-out pattern, and the first lead-out pattern and the first dummy pattern portion are exposed to a first surface of the body.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
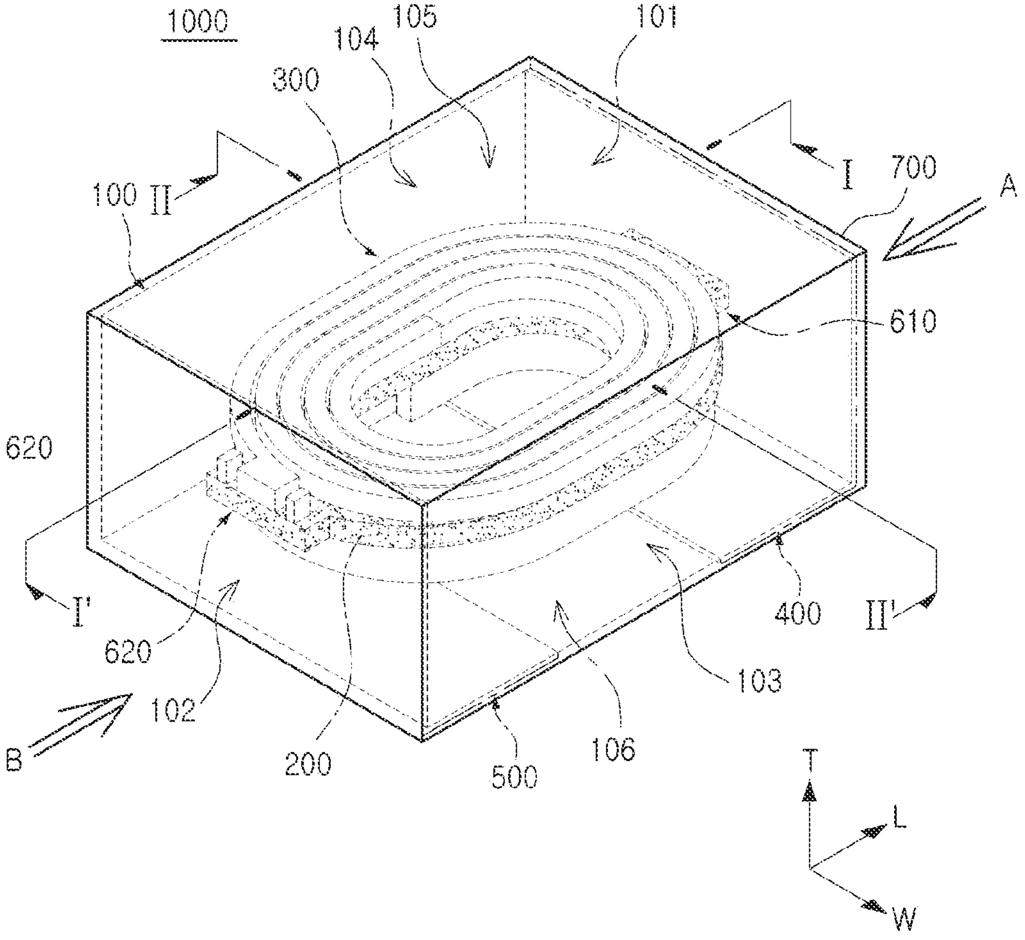
FIG. 1 is a schematic perspective view of a coil component according to an exemplary embodiment of the present disclosure.

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a direction of gravity.

Terms such as "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, an L direction is a first direction or a length (longitudinal) direction, a W direction is a second direction or a width direction, and a T direction is a third direction or a thickness direction.

Hereinafter, a coil component according to an exemplary embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, and the like.

Figure 2:
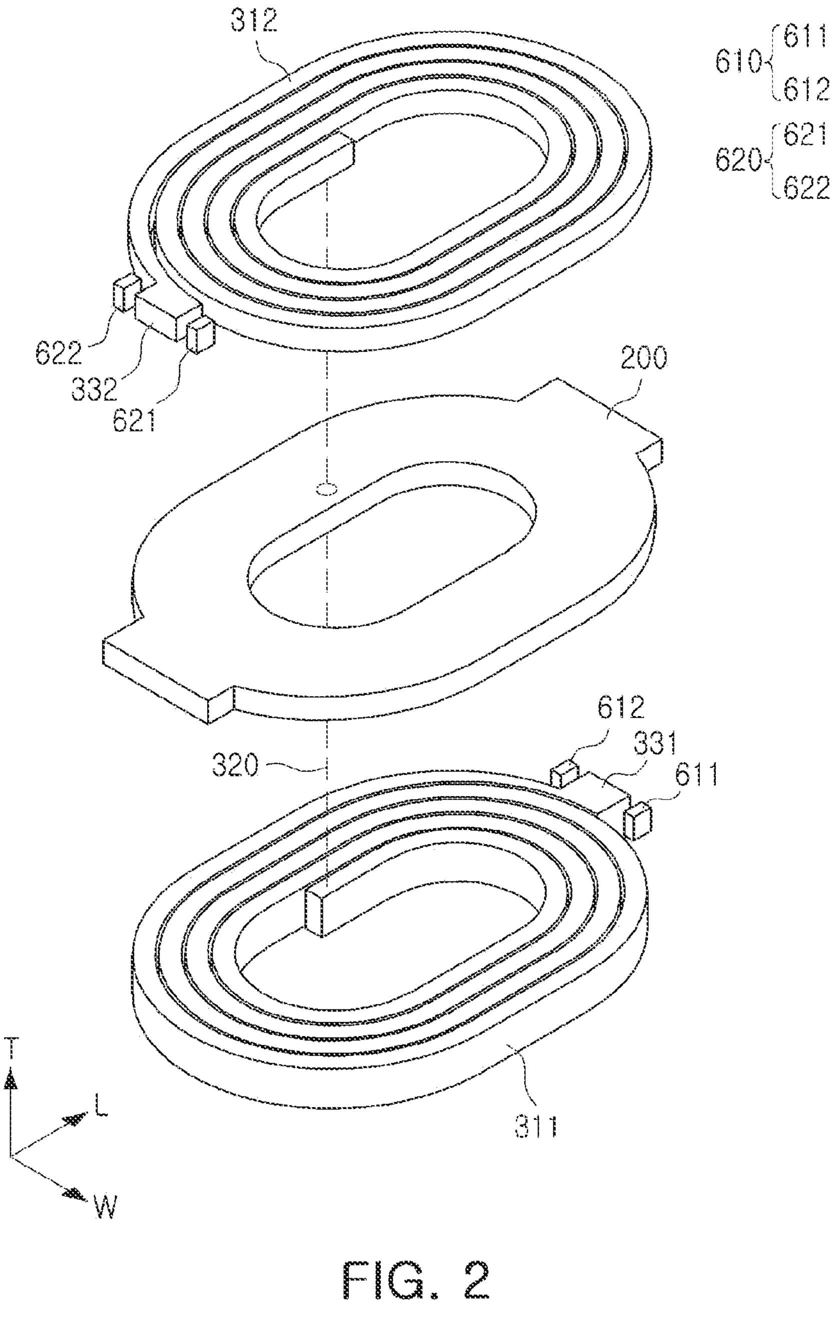
FIG. 2 is a schematic view illustrating coupling relationships of a support substrate, a coil portion, and a dummy pattern portion.
Figure 3:
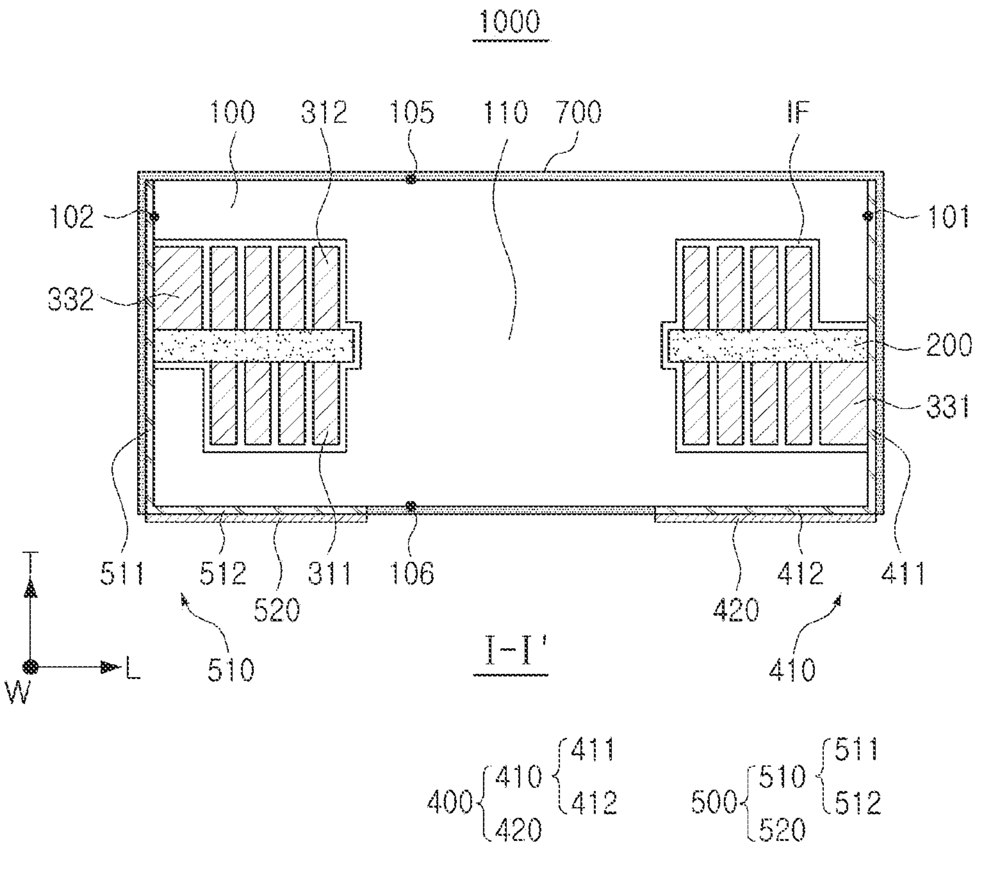
FIG. 3 is a cross-sectional view taken along line I-I' of FIG. 1.
Figure 4:
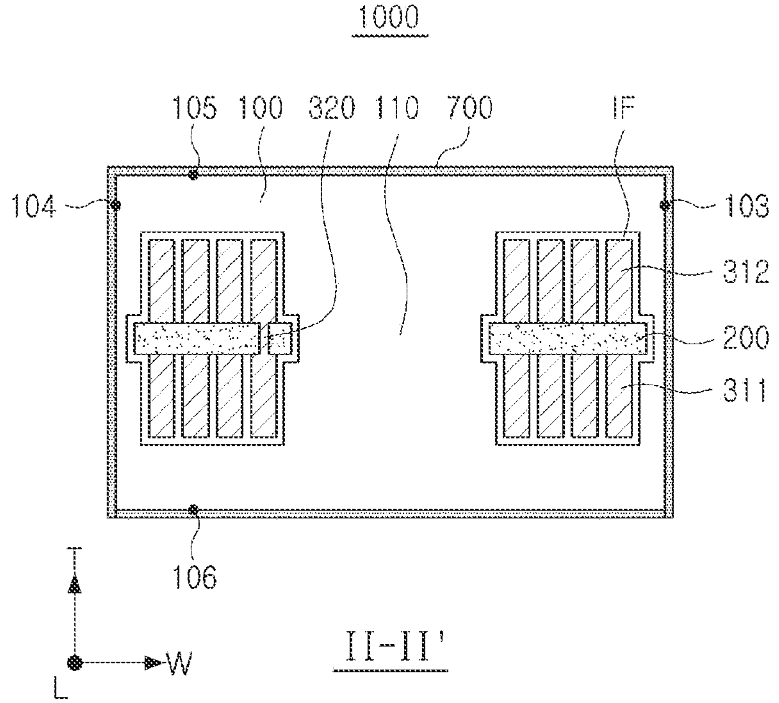
FIG. 4 is a cross-sectional view taken along line II-II' of FIG. 1.
Figure 5:
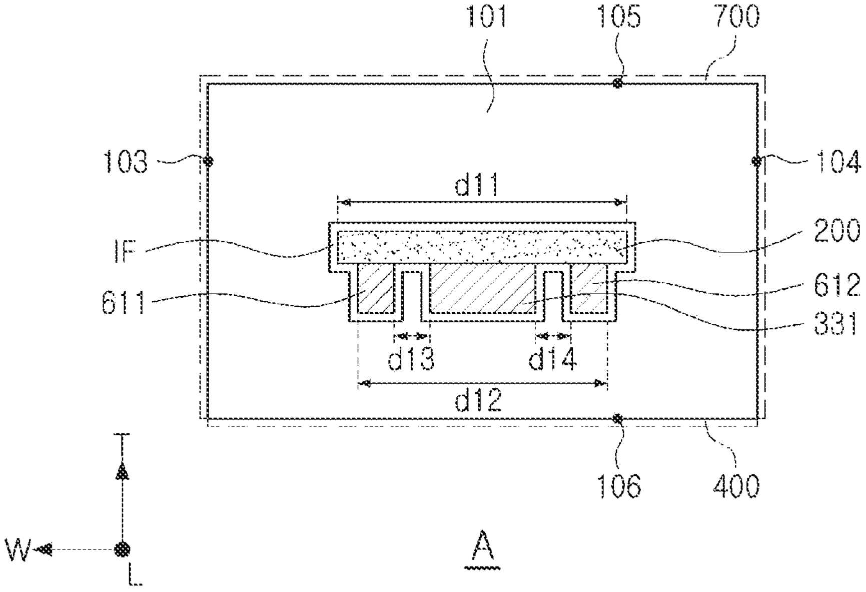
FIG. 5 is a view when viewed in direction A of FIG. 1.
Figure 6:
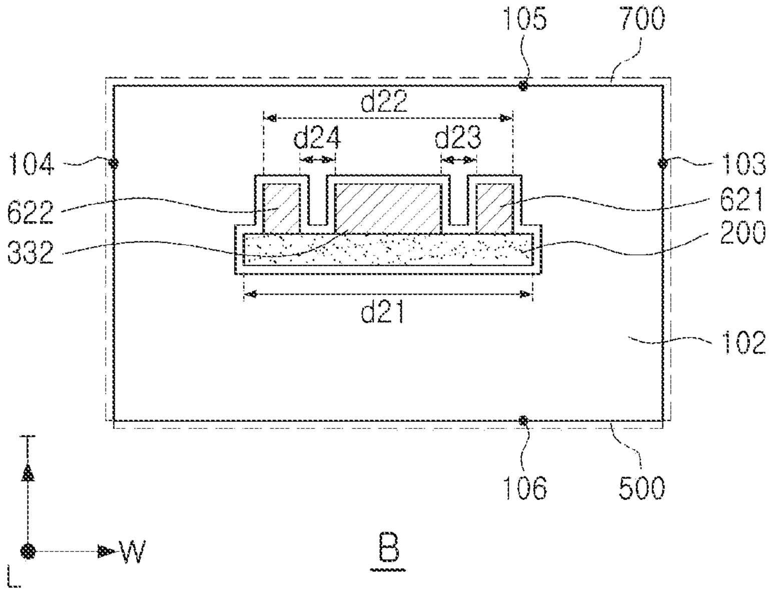
FIG. 6 is a view when viewed in direction B of FIG. 1.

FIG. 1 is a schematic perspective view of a coil component according to an exemplary embodiment. FIG. 2 is a schematic view illustrating coupling relationships of a support substrate, a coil portion, and a dummy pattern portion. FIG. 3 is a cross-sectional view taken along line I-I' of FIG. 1. FIG. 4 is a cross-sectional view taken along line II-II' of FIG. 1. FIG. 5 is a view when viewed in direction A of FIG. 1. FIG. 6 is a view when viewed in direction B of FIG. 1. In each of FIGS. 5 and 6, some configurations of external electrodes are omitted to illustrate detailed coupling relationships of a support substrate exposed to first and second surfaces of a body, a lead-out pattern, and a dummy lead-out portion.

Referring to FIGS. 1 to 6, a coil component 1000 according to an exemplary embodiment may include a body 100, a support substrate 200, a coil portion 300, external electrodes 400 and 500, and dummy pattern portions 610 and 620, and may further include a surface insulating layer 700 and an insulating layer IF.

The body 100 may form an exterior of the coil component 1000 according to the present embodiment, and the support substrate 200 and the coil portion 300 may be embedded therein.

The body 100 may be formed to have a hexahedral shape overall.

Based on directions of FIGS. 1, 3, and 4, the body 100 may have a first surface 101 and a second surface 102 opposing each other in a length direction L, a third surface 103 and a fourth surface 104 opposing each other in a width direction W, and a fifth surface 105 and a sixth surface 106 opposing each other in a thickness direction T. Each of the first to fourth surfaces 101, 102, 103, and 104 of the body 100 may correspond to a wall surface of the body 100 connecting the fifth surface 101 and the sixth surface 106 of the body 100. Hereinafter, both end surfaces (one end surface and the other end surface) of the body 100 may refer to the first surface 101 and the second surface 102 of the body 100, respectively, both side surfaces (one side surface and the other side surface) of the body 100 may refer to the third surface 103 and the fourth surface 104, respectively. In addition, one surface and the other surface of the body 100 may refer to the sixth surface 106 and the fifth surface 105 of the body 100, respectively.

As an example, the body 100 may be formed such that the coil component 1000 according to the present embodiment, in which the external electrodes 400 and 500 and the surface insulating layer 700 to be described later are formed, has a length of 2.0 mm, a width of 1.2 mm, and a thickness of 0.65 mm, but the present disclosure is not limited thereto. Since the above-described numerical values are only design values that do not reflect process errors and the like, it should be considered that they fall within the scope of the present disclosure, to the extent that they are recognized as process errors.

The length of the coil component 1000 may refer to a maximum value, among lengths of a plurality of segments, connecting two outermost boundary lines opposing each other in a length (L) direction of the coil component 1000 and parallel to the length (L) direction of the coil component 1000, based on an optical microscope or scanning electron microscope (SEM) image for a cross section of the coil component 1000 in a length-thickness (L-T) direction in a central portion of the coil component 1000 in a width (W) direction. Alternatively, the length of the coil component 1000 may refer to a minimum value, among lengths of a plurality of segments connecting two outermost boundary lines opposing each other in the length (L) direction of the coil component 1000 illustrated in the cross-sectional image and parallel to the length (L) direction of the coil component 1000. Alternatively, the length of the coil component 1000 may refer to an arithmetic mean of at least two segments, among a plurality of segments connecting two outermost boundary lines opposing each other in the length (L) direction of the coil component 1000, illustrated in the cross-sectional image, and parallel to the length (L) direction of the coil component 1000.

The thickness of the coil component 1000 may refer to a maximum value, among lengths of a plurality of segments, connecting two outermost boundary lines opposing each other in a thickness (T) direction of the coil component 1000 and parallel to the thickness (T) direction of the coil component 1000, based on an optical microscope or scanning electron microscope (SEM) image for a cross section of the coil component 1000 in a length-thickness (L-T) direction in a central portion of the body 100 in a width (W) direction. Alternatively, the thickness of the coil component 1000 may refer to a minimum value, among lengths of a plurality of segments connecting two outermost boundary lines opposing each other in a thickness (T) direction of the coil component 1000 illustrated in the cross-sectional image and parallel to the thickness (T) direction of the coil component 1000. Alternatively, the thickness of the coil component 1000 may refer to an arithmetic mean of at least two segments, among a plurality of segments connecting two outermost boundary lines opposing each other in a thickness (T) direction of the coil component 1000, illustrated in the cross-sectional image, and parallel to the thickness (T) direction of the coil component 1000.

The width of the coil component 1000 may refer to a maximum value, among lengths of a plurality of segments, connecting two outermost boundary lines opposing each other in a width (W) direction of the coil component 1000 and parallel to the width (W) direction of the coil component 1000, based on an optical microscope or scanning electron microscope (SEM) image for a cross section of the coil component 1000 in a length-thickness (L-T) direction in a central portion of the body 100 in a width (W) direction. Alternatively, the width of the coil component 1000 may refer to a minimum value, among lengths of a plurality of segments connecting two outermost boundary lines opposing each other in a width (W) direction of the coil component 1000 illustrated in the cross-sectional image and parallel to the width (W) direction of the coil component 1000. Alternatively, the length of the coil component 1000 may refer to an arithmetic mean of at least two segments, among a plurality of segments connecting two outermost boundary lines opposing each other in a width (W) direction of the coil component 1000, illustrated in the cross-sectional image, and parallel to the width (W) direction of the coil component 1000.

Each of the length, the width, and the thickness of the coil component 1000 may be measured by a micrometer measurement method. In the micrometer measurement method, measurement may be performed may be measured by setting a zero point using a micrometer (instrument) with gage repeatability and reproducibility (R&R), inserting the coil component 1000 inserted between tips of the micrometer, and turning a measurement lever of the micrometer. When the length of the coil component 1000 is measured by a micrometer measurement method, the length of the coil component 1000 may refer to a value measured once or an arithmetic mean of values measured multiple times. This may be equivalently applied to the width and the thickness of the coil component 1000.

The body 100 may include a magnetic material and a resin. Specifically, the body 100 may be formed by laminating at least one magnetic composite sheet in which a magnetic material is dispersed in a resin. The magnetic material may be ferrite or magnetic metal powder particles.

Examples of the ferrite powder particles may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The magnetic metal powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The magnetic metal powder particle may be amorphous or crystalline. For example, the magnetic metal powder particle may be a Fe—Si—B—Cr-based amorphous alloy powder, but is not limited thereto.

Each of the magnetic metal powder particles 10 may have an average diameter of about 0.1 μm to 30 μm, but is not limited thereto.

The body 100 may include two or more types of magnetic metal powder particle dispersed in a resin. The term "different types of magnetic powder particle" means that the magnetic powder particles, dispersed in the resin, are distinguished from each other by at least one of average diameter, composition, crystallinity, and shape.

The resin may include epoxy, polyimide, liquid crystal polymer, or the like, in a single form or combined forms, but is not limited thereto.

The body 100 may include a core 110 penetrating through a central portion of each of the support substrate 200 and the coil portion 300 to be described later. The core 110 may be formed by filling the central portion of each of the coil portion 300 and the support substrate 200 with a magnetic composite sheet, but the present disclosure is not limited thereto.

The support substrate 200 may be disposed in the body 100. The support substrate 200 may be configured to support the coil portion 300 to be described later.

The support substrate 200 may include an insulating material, for example, a thermosetting insulating resin such as an epoxy resin, a thermoplastic insulating resin such as polyimide, or a photosensitive insulating resin, or the support substrate 200 may include an insulating material in which a reinforcing material such as a glass fiber or an inorganic filler is impregnated with an insulating resin. For example, the support substrate 200 may include an insulating material such as a copper clad laminate (CCL), prepreg, Ajinomoto Build-up Film (ABF), FR-4, a bismaleimide triazine (BT) film, a photoimageable dielectric (PID) film, and the like, but are not limited thereto.

The inorganic filler may be at least one or more selected from the group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

When the support substrate 200 is formed of an insulating material including a reinforcing material, the support substrate 200 may provide more improved rigidity. When the support substrate 200 is formed of an insulating material including no glass fiber, the support substrate 200 is advantageous for thinning the entire coil portion 300. In addition, based on a component having the same volume, a volume occupied by the coil portion 300 and/or magnetic metal powder particles may be increased to improve component characteristics. When the support substrate 200 is formed of an insulating material including a photosensitive insulating resin, the number of processes for forming the coil portion 300 may be decreased. Therefore, it may be advantageous in reducing production costs, and a fine via may be formed.

The coil portion 300 may disposed inside the body 100 to express characteristics of a coil component. For example, when the coil component 1000 according to the present embodiment is used as a power inductor, the coil portion 300 may serve to store an electric field as a magnetic field to maintain an output voltage, allowing power of an electronic device to be stabilized.

The coil portion 300 may include coil patterns 311 and 312, a via 320, and lead-out patterns 331 and 332. Specifically, the coil portion 300 may be provided such that, based on the direction of FIG. 3, a first coil pattern 311 and a second lead-out pattern 331 are disposed on a lower surface of the support substrate 200 facing the sixth surface 106 of the body 100, and a second coil pattern 312 and a second lead-out pattern 332 are disposed on an upper surface of the support substrate 200 facing the lower surface of the support substrate 200. The via 320 may penetrate through the support substrate 200 to be in contact with and connected to an internal end portion of each of the first coil pattern 311 and the second coil pattern 312. The first and second lead-out patterns 331 and 332 may be respectively exposed to the first and second surfaces 101 and 102 of the body 100, and may be respectively connected to the first and second external electrodes 400 and 500 to be described later. Accordingly, the coil portion 300 may overall serve as a single coil between the first and second external electrodes 400 and 500.

Each of the first coil pattern 311 and the second coil pattern 312 may have a planar spiral shape in which at least one turn is formed around the core 110. For example, the first coil pattern 311 may form at least one turn around the core 110 on the lower surface of the support substrate 200.

The lead-out patterns 331 and 332 may be exposed to the first and second surfaces 101 and 102 of the body 100, respectively. Specifically, the first lead-out pattern 331 may be exposed to the first surface 101 of the body 100, and the second lead-out pattern 332 may be exposed to the second surface 102 of the body 100.

At least one of the coil patterns 311 and 312, the via 320, and the lead-out patterns 331 and 332 may include at least one conductive layer.

As an example, when the second coil pattern 312, the via 320, and the second lead-out pattern 332 are formed on the upper surface of the support substrate 200 by plating, each of the second coil pattern 312, the via 320, and the second lead-out pattern 332 may include a seed layer and an electroplating layer. In this case, the electroplating layer may have a single layer structure or a multilayer structure. An electroplating layer having a multilayer structure may be formed to have a conformal layer structure in which one electroplating layer is formed along a surface of another electroplating layer, or may be formed to have a structure in which one electroplating layer is stacked on only one surface of another electroplating layer. The seed layer may be formed by electroless plating or vapor deposition such as sputtering. The seed layer of the second coil pattern 312, the seed layer of the via 320, and the seed layer of the second lead-out pattern 332 may be integrated with each other, such that boundaries therebetween may not be formed, but the present disclosure is not limited thereto. The electroplating layer of the second coil pattern 312, the electroplating layer of the via 320, and the electroplating layers of the second lead-out pattern 332 may be integrated with each other, such that boundaries therebetween may not be formed, but the present disclosure is not limited thereto.

Each of the coil patterns 311 and 312, the via 320, and the lead-out patterns 331 and 332 may be formed of a conductive material such as copper (Cu), aluminum (Al), silver (Ag), tin (Sn), gold (Au), nickel (Ni), lead (Pb), titanium (Ti), chromium (Cr), or alloys thereof, but the present disclosure is not limited thereto.

The external electrodes 400 and 500 may be disposed to be spaced apart from each other on the body 100, and may be connected to the coil portion 300. In the present embodiment, the external electrodes 400 and 500 may include first layers 410 and 510, and second layers 420 and 520 disposed on at least a portion of the first layers 410 and 510. The first layers 410 and 510 of the external electrodes 400 and 500 may include pad portions 412 and 512, disposed to be spaced apart from each other on the sixth surface 106 of the body 100, and connecting portions 411 and 511 disposed on the second surfaces 101 and 102 of the body 100. Specifically, the first layer 410 of the first external electrode 400 may include a first connection portion 411, disposed on the first surface 101 of the body 100 to be in contact with the first lead-out pattern 331 exposed to the first surface 101 of the body 100, and a first pad portion 412 extending from the first connection part 411 to the sixth surface 106 of the body 100. The first layer 510 of the second external electrode 500 may include a second connection portion 511, disposed on the second surface 102 of the body 100 to be in contact with the second lead-out pattern 332 exposed to the second surface 102 of the body 100, and a second connection portion 512 extending from the second connection part 511 to the sixth surface 106 of the body 100. The first and second pad portions 412 and 512 may be disposed to be spaced apart from each other on the sixth surface 106 of the body 100. The connection portions 411 and 511 and the pad portions 412 and 512 may be formed together in the same process to be integrated with each other without forming boundaries therebetween, but the scope of the present disclosure is not limited thereto.

The first layers 410 and 510 may be formed by vapor deposition such as sputtering, or plating. Alternatively, the first layers 410 and 510 may be formed by applying and curing conductive powder particles, including at least one of copper (Cu) and silver (Ag), and a conductive paste including an insulating resin. As an example, each of the first layers 410 and 510 may be a copper (Cu) plating layer, but the scope of the present disclosure is not limited thereto.

The second layers 420 and 520 may be disposed on at least a portion of the first layers 410 and 510. The second layers 420 and 520 may be formed by vapor deposition such as sputtering, or plating. Alternatively, the first layers 420 and 520 may be formed by applying and curing conductive powder particles, including at least one of copper (Cu) and silver (Ag), and a conductive paste containing an insulating resin. For example, each of the second layers 420 and 520 may have a structure in which two or more layers including a nickel (Ni) plating layer and a tin (Sn) plating layer are disposed, but the scope of the present disclosure is not limited thereto. In FIG. 3, the second layers 420 and 520 are illustrated as only being disposed on the pad portions 412 and 512, but this is only an example, and the scope of the present disclosure is not limited thereto.

Each of the external electrodes 400 and 500 may be formed of a conductive material such as copper (Cu), aluminum (Al), silver (Ag), tin (Sn), gold (Au), nickel (Ni), lead (Pb), chromium (Cr), titanium (Ti), or alloys thereof, but the present disclosure is not limited thereto.

The dummy pattern portions 610 and 620 may be disposed to be spaced apart from the lead-out patterns 331 and 332 on the support substrate 200, and may be exposed to the first and second surfaces 101 and 102 of the body 100 together with the lead-out patterns 331 and 332 and the support substrate 200, respectively. Specifically, based on the directions of FIGS. 2 and 5, the first dummy pattern portion 610 may be disposed on the lower surface of the support substrate 200 together with the first lead-out pattern 331, and may be spaced apart from the first lead-out pattern 331. The first dummy pattern portion 610 may be exposed to the first surface 101 of the body 100 together with the first lead-out pattern 331 and the support substrate 200. The second dummy pattern portion 620 may be disposed on the upper surface of the support substrate 200 together with the second lead-out pattern 332, and may be spaced apart from the second lead-out pattern 332. The second dummy pattern portion 620 may be exposed to the second surface 102 of the body 100 together with the second lead-out pattern 332 and the support substrate 200.

In the case of a typical thin-film coil component, a plurality of coils, forming rows and columns to be connected to each other, may be formed on a large-area substrate such as a panel substrate, a magnetic composite sheet may be laminated on such a substrate to form a coil bar, and a dicing process may be performed on the coil bar to form a body of a plurality of individual components. Before laminating the magnetic composite sheet on the substrate, among regions of the substrate corresponding to the individual components, except for a region in which a coil is formed, the other regions may be trimmed to increase an effective volume of a magnetic material in each of the individual components. A coil, disposed in a region corresponding to one of the components in the trimming process, and a coil, disposed in a region disposed on an external side of a corresponding region in a length direction L (a region corresponding to another component), may be connected to a lead-out pattern (an end portion of a coil), exposed to a surface of each of the components after the dicing process, by the substrate. In the dicing process, cracking may occur between the coil and the body because materials of the coil and the body are different from each other, a volume of the lead-out pattern, an end portion of the coil, may be reduced. However, as the volume of the lead-out pattern is reduced, a volume of the end portion of the substrate, supporting the lead-out pattern, may be reduced to deteriorate a function of the substrate supporting adjacent individual coils, causing warpage to occur in the large-area substrate. In the present embodiment, the dummy pattern portions 610 and 620 may be disposed to be spaced apart from the lead-out patterns 331 and 332 on the support substrate 200, and may be exposed to the surfaces 101 and 102 of the body 100 together with the lead-out patterns 331 and 332, respectively. Therefore, the dummy pattern portions 610 and 620 may support the lead-out patterns 331 and 332 to increase an area (further, a volume) of one region of the support substrate 200 exposed to the surfaces 101 and 102 of the body 100. Accordingly, the area (the volume) of the lead-out patterns 331 and 332 may be reduced to prevent cracking caused by the above-described dicing process, and an area (further, a volume) of the substrate 200, exposed to the first and second surfaces 101 and 102 of the body 100, may be increased. Thus, warpage of the large-area substrate may be prevented during the process.

The dummy pattern portions 610 and 620 may include first to fourth dummy patterns 611, 612, 621, and 622, respectively disposed between the third surface 103 of the body 100 and the first and second lead-out patterns 331 and 332 and between the fourth surface 104 of the body 100 and the first and second lead-out patterns 331 and 332, respectively. Specifically, the first dummy pattern portion 610 may include a first dummy pattern 611, disposed between the third surface 103 of the body 100 and the first lead-out pattern 331, and a second dummy pattern 612 disposed between the four surfaces 104 of the body 100 and the first lead-out pattern 331. The second dummy pattern portion 620 may include a third dummy pattern 621, disposed between the third surface 103 of the body 100 and the second lead-out pattern 332, and a fourth dummy pattern 622 disposed between a fourth surface 104 of the body 100 and the second lead-out pattern 332. The first and second dummy pattern 611 and 612 may be exposed to the first surface 101 of the body 100 together with the first lead-out pattern 331, and the third and fourth dummy pattern 621 and 622 may be exposed to the second surface 102 of the body 100 together with the lead-out pattern 332. Since the first to fourth dummy patterns 611, 612, 621, 622 are disposed on the external side of each of both side surfaces facing the third and fourth surfaces 103 and 104 of the body 100 of the lead-out patterns 331 and 332, the volume of the support substrate 200, supporting the lead-out patterns 331 and 332, (further, an exposed area of the support substrate 200 exposed to the first and second surfaces 101 and 102) may be increased.

Referring to FIG. 5, a length d11 of the support substrate 200 the body 100 in a width direction W on the first surface 101 of the body 100 may be greater than a length d12 from a side surface of the first dummy pattern 611, adjacent to the third surface 103 of the body 100, to a side surface of the second dummy pattern 612, adjacent to the fourth surface 104 of the body 100, on the first surface 101 of the body 100. Referring to FIG. 6, a length d21 of the support substrate 200 in a width direction W on the second surface 102 of the body 100 may be greater than a length d22 from a side surface of the third dummy pattern 621, adjacent to the third surface 103 of the body 100, to a side surface of the fourth dummy pattern 622, adjacent to the fourth side 104 of the body 100, on the second surface 102 of the body 100. For example, a length of one end portion of the support substrate 200, supporting the first lead-out pattern 321, in the width direction W may be greater than a length between outermost side surfaces of each of the first and second dummies 611 and 621 in the width direction W, and a length of the other end portion of the support substrate 200, supporting the second lead-out pattern 322, in the width direction W may be greater than a length between the outermost side surfaces of each of the third and fourth dummies 621 and 622 in the width direction W. Thus, a function of preventing deformation of the support substrate 200 during the above-mentioned process may be improved.

Referring to FIG. 5, a gap d13 between the first lead-out pattern 331 and the first dummy pattern 611 in the width direction W may be substantially the same as a gap d14 between the first lead-out pattern 331 and the second dummy pattern 612 in the width direction W. Since the gap d13 between the first lead-out pattern 331 and the first dummy pattern 611 is substantially the same as the gap d14 between the first lead-out pattern 331 and the second dummy pattern 612, deformation of one end portion of the support substrate 200, caused by an anisotropic length between the second dummy pattern 611 and 612 and the first lead-out pattern 331, may be prevented. Referring to FIG. 6, a gap d23 between the second lead-out pattern 332 and the third dummy pattern 621 in the width direction W may be substantially the same as a gap d24 between the second lead-out pattern 332 and the fourth dummy pattern 622 along the width direction W. Since the gap d23 between the second lead-out pattern 332 and the third dummy pattern 621 is substantially the same as the gap d24 between the second lead-out pattern 332 and the fourth dummy pattern 622, deformation of the other end portion of the support substrate 200, caused by an asymmetric distance between the fourth dummy pattern 621 and 622 and the second lead-out pattern 332, may be prevented.

Referring to FIG. 5, at least a portion of the body 100 may be disposed between the first lead-out pattern 321 and the first dummy pattern 611 and in each of the first lead-out pattern 321 and the second dummy pattern 612. Referring to FIG. 6, at least a portion of the body 100 may be disposed in each of the second lead-out pattern 322 and the third dummy pattern 621 and in each of the second lead-out pattern 322 and the fourth dummy pattern 622. Since at least a portion of the body 100 is disposed in a separation space between the lead-out patterns 321 and 322 and the first to fourth dummy pattern 611, 612, 621, and 622, an effective volume of a magnetic material may be increased. In addition, due to at least a portion of the body 100 disposed in the separation space, coupling force between the body 100 and the lead-out patterns 331 and 332, and further, between the body 100 and the coil portion 300 may be increased (an anchoring effect). At least a portion of the body 100, disposed in the separation space, does not penetrate through the support substrate 200. For example, no configuration penetrating through the support substrate 200 may be formed in one end portion and the other end portion of the support substrate 200 supporting the lead-out patterns 331 and 332. Accordingly, the support substrate 200 may be continuously exposed on each of the first and second surfaces 101 and 102 of the body 100. For example, a lower surface (based on the direction of FIG. 5) of the support substrate 200, supporting the first lead-out pattern 331 and the first dummy pattern portions 611 and 612, may be continuously exposed to the first surface 101 of the body 100, and an upper surface (based on the direction of FIG. 6) of the support substrate 200, supporting the second lead-out pattern 332 and the second dummy patterns 621 and 622, may be continuously exposed to the second surface of the body 100. Thus, a function of supporting one end portion and the other end portion of the support substrate 200, supporting two adjacent coil portions in a length direction, may be improved.

Referring to FIGS. 5 and 6, a distance d12 from a side surface of the first dummy pattern 611 adjacent to the fourth surface of the body 100 to a side surface of the second dummy pattern 612 adjacent to the fourth surface 104 of the body 100 on the first surface 101 of the body 100 may be substantially the same as a distance d22 from a side surface of the third dummy pattern 621 adjacent to the third surface 103 of the body 100 to a side surface of the fourth dummy pattern 622 adjacent to the fourth surface 104 of the body 100 on the second surface 102 of the body 100. Further, a length d11 of the support substrate 200, exposed to the first surface 101 of the body 100, may be substantially the same as a length d21 of the support substrate 200 exposed to the second surface 102 of the body 100. In this case, since volumes of one end portion and the other end portion of the support substrate 200 may be substantially the same as each other, deformation of the support substrate 200 may be prevented from occurring during a process due to the different volumes of both end portions of the support substrate 200.

An insulating layer IF may be disposed between the coil portion 300 and the body 100 and between the support substrate 200 and the body 100. The insulating layer IF may be formed along a surface of the support substrate 200 on which the coil patterns 311 and 312, the lead-out patterns 331 and 332, and the dummy pattern portions 610 and 620 are formed. The insulating layer IF may be provided to insulate the coil portion 300 and the body 100, and may include a known insulating material such as parylene, but the present disclosure is not limited thereto. As another example, the insulating layer IF may include an insulating material such as an epoxy resin other than parylene. The insulating layer IF may be formed by vapor deposition, but the present disclosure is not limited thereto. As another example, the insulating layer IF may be formed by laminating and curing an insulating film for forming the insulating layer IF on both surfaces of the support substrate 200 on which the coil portion 300 is formed. Alternatively, the insulating layer IF may be formed by applying and curing an insulating paste for forming an insulating layer IF on both surfaces of the support substrate 200 on which the coil portion 300 is formed. Since the insulating layer IF is formed on a large-area substrate before a dicing process, the lead-out patterns 331 and 332, the insulating layer IF may be exposed to the first and second surfaces 101 and 102 of the body 100 to surround the lead-out pattern 331 and 331, the dummy pattern portions 610 and 620, and the support substrate 200 in an individual component subjected to the dicing process.

The coil component 1000 according to the present embodiment may further include surface insulating layers 700 disposed on each of the first to fifth surfaces 101, 102, 103, 104 and 105 of the body 100 and in a region of the sixth surface 106 of the body 100, except for a region in which the external electrodes 400 and 500 are disposed. The surface insulating layer 700, disposed on each of the first and second surfaces 101 and 102 of the body 100, may cover the connection portions 411 and 511 of the first layers 410 and 510 of the external electrodes 400 and 500. The surface insulating layer 700, disposed on each of the first and second surfaces 101 and 102 of the body 100, and the surface insulating layer 700, in the region of the sixth surface 106 of the body 100, except for the region in which the external electrodes 400 and 500 are disposed, may be formed together in the same process to be integrated with each other, such that a boundary may not be formed therebetween. Alternatively, at least one of the surface insulating layer 700, disposed on each of the first and second surfaces 101 and 102 of the body 100, and the surface insulating layer 700, in the region of the sixth surface 106 of the body 100, except for the region in which the external electrodes 400 and 500 are disposed, may be formed in a process different from a process of forming the other surface insulating layer 700, such that a boundary may be formed therebetween. At least a portion of the surface insulating layer 700 may serve as a mask during formation of at least a portion of the external electrodes 400 and 500, but the scope of the present disclosure is not limited thereto.

The surface insulating layer 700 may include a thermoplastic resin such as a polystyrene-based resin, a vinyl-acetate-based resin, a polyester-based resin, a polyethylene-based resin, a polypropylene-based resin, a polyamide-based resin, a rubber-based resin, or an acrylic-based resin, a thermosetting resin such as a phenol-based resin, an epoxy-based resin, a urethane-based resin, a melamine-based resin, or an alkyd-based resin, a photosensitive resin, parylene, $SiO_x$, or $SiN_x$. The surface insulating layer 700 may further include an insulating filler such as an inorganic filler, but the present disclosure is not limited thereto.

As described above, a coil component for preventing deformation of a support substrate, on which a coil portion is formed, may be provided.

While exemplary embodiments have been shown and described above, it will be apparent to those skilled in the art that modifications and variations could be made without departing from the scope of the present disclosure as defined by the appended claims.

What is claimed is:

1. A coil component comprising:

a body;

a support substrate disposed in the body and having a first surface and a second surface opposing each other in a thickness direction;

a coil portion comprising a first lead-out pattern disposed on the first surface of the support substrate;

a first dummy pattern portion disposed to be spaced apart, in a width direction, from the first lead-out pattern on the first surface of the support substrate; and a first external electrode disposed on the body to be connected to the first lead-out pattern, wherein the first lead-out pattern and the first dummy pattern portion are exposed to a first surface of the body, exposed ends of the first lead-out pattern and the first dummy pattern portion to the first surface of the body are spaced apart from each other in the width direction, the first dummy pattern portion comprises a first dummy pattern and a second dummy pattern, and the first lead-out pattern is disposed between the first dummy pattern and the second dummy pattern in the width direction, an entire portion of the first lead-out pattern is spaced apart, in the width direction, from entire portions of the first dummy pattern and the second dummy pattern, the coil portion is disposed on the first surface and the second surface of the support substrate, the first dummy pattern portion is spaced apart from external surfaces of the body in the thickness direction, and in a cross-sectional view of the body cut through the first dummy pattern portion in the thickness and width directions, a length between outer side surfaces of the support substrate in the width direction is greater than a length between outer side surfaces of the first dummy pattern portion in the width direction, the outer side surfaces of the support substrate being spaced apart from external surfaces of the body in the width direction.

2. The coil component of claim 1, wherein the body has a second surface, opposing the first surface of the body, and a third surface and a fourth surface, respectively connecting the first surface and the second surface to each other and opposing each other, the first surface of the support substrate, supporting the first lead-out pattern and the first dummy pattern portion, is continuously exposed to the first surface of the body, and the first dummy pattern and the second dummy pattern are respectively disposed between the third surface of the body and the first lead-out pattern and between the fourth surface of the body and the first lead-out pattern.

3. The coil component of claim 2, wherein a first portion of the body is disposed between the first lead-out pattern and the first dummy pattern, and a second portion of the body is disposed between the first lead-out pattern and the second dummy pattern.

4. The coil component of claim 3, wherein the first portion of the body, disposed between the first lead-out pattern and the first dummy pattern, and the second portion of the body, disposed between the first lead-out pattern and the second dummy pattern, do not penetrate through the support substrate.

5. The coil component of claim 1, wherein on the first surface of the body, a gap between the first lead-out pattern and the first dummy pattern in the width direction is substantially the same as a gap between the first lead-out pattern and the second dummy pattern in the width direction.

6. The coil component of claim 2, wherein the coil portion further comprises:

a second lead-out pattern disposed on the second surface of the support substrate opposing first surface of the support substrate; and a second dummy pattern portion disposed to be spaced apart from the second lead-out pattern on the second surface of the support substrate, the second lead-out pattern and the second dummy pattern portion are exposed to the second surface of the body and spaced apart from each other, and the second surface of the support substrate, supporting the second lead-out pattern and the second dummy pattern portion, is continuously exposed to the second surface of the body.

7. The coil component of claim 6, wherein the second dummy pattern portion comprises a third dummy pattern and a fourth dummy pattern, respectively disposed between the third surface of the body and the second lead-out pattern and between the fourth surface of the body and the second lead-out pattern.

8. The coil component of claim 7, wherein a length from a side surface of the first dummy pattern adjacent to the third surface of the body to a side surface of the second dummy pattern adjacent to the fourth surface of the body on the first surface of the body is substantially the same as a length from a side surface of the third dummy pattern adjacent to the third surface of the body to a side surface of the fourth dummy pattern adjacent to the fourth surface of the body on the second surface of the body.

9. The coil component of claim 7, further comprising:

an insulating layer disposed between the coil portion and the body, wherein the insulating layer covers the support substrate, the first and second lead-out patterns, and each of the first to fourth dummy patterns to be exposed to each of the first and second surfaces of the body.

10. A coil component comprising:

a body;

a support substrate disposed in the body and having a first surface and a second surface opposing each other in a thickness direction;

a coil portion comprising a first coil pattern and a first lead-out pattern disposed on the first surface of the support substrate, the first lead-out pattern extending from the first coil pattern;

a first dummy pattern portion disposed directly on the first surface of the support substrate; and a first external electrode disposed on the body to be connected to the first lead-out pattern, wherein the first dummy pattern portion is spaced apart from the first coil pattern and the first lead-out pattern, the first lead-out pattern and the first dummy pattern portion are exposed to a first surface of the body, exposed ends of the first lead-out pattern and the first dummy pattern portion to the first surface of the body are spaced apart from each other in a width direction, the first dummy pattern portion comprises a first dummy pattern and a second dummy pattern, and the first lead-out pattern is disposed between the first dummy pattern and the second dummy pattern in the width direction, an entire portion of the first lead-out pattern is spaced apart from entire portions of the first dummy pattern and the second dummy pattern in the width direction, the coil portion is disposed on the first surface and the second surface of the support substrate, the first dummy pattern portion is spaced apart from external surfaces of the body in the thickness direction, and in a cross-sectional view of the body cut through the first dummy pattern portion in the thickness and width directions, a length between outer side surfaces of the support substrate in the width direction is greater than a length between outer side surfaces of the first dummy pattern portion in the width direction, the outer side surfaces of the support substrate being spaced apart from external surfaces of the body in the width direction.

11. The coil component of claim 10, wherein at least a portion of the support substrate is located below a space between the first dummy pattern portion and the first lead-out pattern.

12. The coil component of claim 10, wherein the body has a second surface, opposing the first surface of the body, and a third surface and a fourth surface, respectively connecting the first surface and the second surface to each other and opposing each other in the width direction, and the first dummy pattern and the second dummy pattern are respectively disposed between the third surface of the body and the first lead-out pattern and between the fourth surface of the body and the first lead-out pattern.

13. The coil component of claim 10, wherein on the first surface of the body, a gap between the first lead-out pattern and the first dummy pattern in the width direction is substantially the same as a gap between the first lead-out pattern and the second dummy pattern in the width direction.

14. The coil component of claim 12, wherein the coil portion further comprises:

a second coil pattern and a second lead-out pattern disposed on a second surface of the support substrate opposing first surface of the support substrate, the second lead-out pattern extending from the second coil pattern; and a second dummy pattern portion disposed on the second surface of the support substrate and spaced apart from the second coil pattern and the second lead-out pattern, and the second lead-out pattern and the second dummy pattern portion are exposed to the second surface of the body.

15. The coil component of claim 14, wherein the second dummy pattern portion comprises a third dummy pattern and a fourth dummy pattern, respectively disposed between the third surface of the body and the second lead-out pattern and between the fourth surface of the body and the second lead-out pattern.

16. The coil component of claim 15, wherein a length from a side surface of the first dummy pattern adjacent to the third surface of the body to a side surface of the second dummy pattern adjacent to the fourth surface of the body on the first surface of the body is substantially the same as a length from a side surface of the third dummy pattern adjacent to the third surface of the body to a side surface of the fourth dummy pattern adjacent to the fourth surface of the body on the second surface of the body.

17. The coil component of claim 10, wherein the first surface of the support substrate, supporting the first lead-out pattern and the first dummy pattern portion, is exposed to the first surface of the body.

* * * * *